United States Patent
He (10) Patent No.: US 10,482,848 B2
(45) Date of Patent: Nov. 19, 2019

(54) FACILE AND PRECISE GEOREFERENCING AND OVERLAYING OF MAP TILES

(71) Applicant: International Business Machines Corporation, Armonk, NY (US)

(72) Inventor: Rui He, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/820,598

(22) Filed: Aug. 7, 2015

(65) Prior Publication Data

US 2017/0040004 A1   Feb. 9, 2017

(51) Int. Cl.
| | |
|---|---|
| G09G 5/377 | (2006.01) |
| G09G 5/02 | (2006.01) |
| G09G 5/14 | (2006.01) |
| G06T 3/00 | (2006.01) |

(52) U.S. Cl.
CPC ........... *G09G 5/377* (2013.01); *G06T 3/0068* (2013.01); *G09G 5/026* (2013.01); *G09G 5/14* (2013.01); *G09G 2320/0666* (2013.01); *G09G 2340/12* (2013.01); *G09G 2360/121* (2013.01); *G09G 2360/18* (2013.01); *G09G 2370/022* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 7,925,982 B2 | 4/2011 | Parker et al. | |
| 8,649,567 B1* | 2/2014 | Maltby, II | G06T 17/05 382/106 |
| 2004/0117358 A1* | 6/2004 | von Kaenel | G06F 17/30241 |
| 2009/0172511 A1* | 7/2009 | Decherd | G06F 17/3087 715/207 |
| 2009/0210388 A1* | 8/2009 | Elson | G06F 17/30241 |
| 2010/0034483 A1* | 2/2010 | Giuffrida | G06T 3/4038 382/284 |
| 2013/0024548 A1* | 1/2013 | Obara | G08G 1/0968 709/219 |

(Continued)

OTHER PUBLICATIONS

Rinner et al., "Design With Nature 2.0—A Geodata Infrastructure Approach to Map Overlay", Ryerson University, Digital Commons @ Ryerson, In A. Schwering, E.Pebeszma K. Behncke: Geoinformatik 2011—Geochange. ifgiPrints No. 41, Akademische Verlagsgesellschaft, Heidelberg, Germany, pp. 21-28, <http://digitalcommons.ryerson.ca/geography>.

(Continued)

*Primary Examiner* — Aaron M Richer
(74) *Attorney, Agent, or Firm* — Adolph Bohnstedt; Arnold B. Bangali (57) ABSTRACT

One or more processors receive a map image file. The map image file includes geographical data. One or more processors convert the map image file into a raster map image file. The raster map image file includes one or more first raster images. The one or more first raster images include a first plurality of pixels. One or more processors label one or more of the first plurality of pixels with a first set of geographical coordinates using at least a portion of the geographical data included in the map image file.

12 Claims, 5 Drawing Sheets

(56) References Cited

U.S. PATENT DOCUMENTS

2013/0328879 A1* 12/2013 Carbonneau ............ G06T 11/00
                                                                           345/440
2014/0267279 A1     9/2014 Kontkanen

OTHER PUBLICATIONS

"Digital Images and Georeferencing", 3 pages, provided in correspondence by inventor per memo dated Mar. 10, 2015, <http://magic.lib.uconn.edu/help/help_DigitalImagesandGeoreferencing.html>.

"Mann Library GIS Tutorial", Georeferencing a digital image in ArcMap, pp. 1-4, provided by patent professional per memo dated Jun. 15, 2015, <https://mannlib.cornell.edu/files/documents/ArcGIS_Georeferencing_An_Image_v10.0.pdf>.

* cited by examiner

FACILE AND PRECISE GEOREFERENCING AND OVERLAYING OF MAP TILES

BACKGROUND OF THE INVENTION

The present invention relates generally to the field of georeferencing, and more particularly to georeferencing and overlaying geographic map layers with speed and precision.

Geographic information systems (GIS) are systems designed to capture, store, manipulate, analyze, manage, and present all types of spatial or geographical data. In GIS, georeferencing refers to the alignment of a first map image without geographical coordinates onto a second map image with geographical coordinates thereby providing geographical context to the first map image. Typically this is done by the alignment of features both map images share. The precision of the alignment in these cases depends on how many features are aligned in the process, which ultimately depends on the number of features shared between the map images.

SUMMARY

Embodiments of the present invention provide a method, system, and program product to georeferenced and overlay map tiles. One or more processors receive a map image file, wherein the map image file includes geographical data. One or more processors convert the map image file into a raster map image file, wherein the raster map image file includes one or more first raster images. The one or more first raster images include a first plurality of pixels. One or more processors label one or more of the first plurality of pixels with a first set of geographical coordinates using at least a portion of the geographical data included in the map image file.

DETAILED DESCRIPTION

Georeferencing a map image typically involves pairing points on the map image with points on another map image that is already georeferenced. In these cases, both the un-georeferenced map image and the georeferenced map image (i.e., the "control map image") are required to have one or more visible features in common such as road intersections, building corners, etc. The software used typically requires the user to manually pair ground control points (GCPs) between the map images. In general, this method is labor intensive and time consuming because the precision of georeferencing the un-georeferenced map image is proportional to the number of GCPs that are paired during this process. In addition, the manual aspect of the process introduces the likelihood of errors, which can render a subsequent overlay of the two map images as less than satisfactory. As used herein, the term georeferencing, and like terms, generally refers to aligning geographic data to a known coordinate system so it can be viewed, queried, and analyzed with other geographic data. Georeferencing may involve shifting, rotating, scaling, skewing, and in some cases warping, rubber sheeting, or orthorectifying the data.

Raster images, by definition, are comprised of a plurality of pixels. Thus, a georeferenced raster map image can be labeled pixel by pixel with geographic coordinates unique for each pixel. The geographic coordinates can be, for example, latitude/longitude, Universal Transverse Mercator (UTM), or State Plane (SPS) coordinates.

Specialized map image files, such as those showing flood zones, are available from organizations such as the Federal Emergency Management Agency (FEMA). Many of these map image files include geographic data, which can be transposed onto individual pixels if the map image files are converted to raster map image files. The geographically labeled pixels of one raster map image tile can be automatically paired with identically labeled pixels from another raster image tile to provide a precise overlay of the two raster map image tiles.

Embodiments of the present invention recognize that manual georeferencing of map image tiles in order to precisely overlay them is labor intensive, time consuming, and error prone. Embodiments of the present invention provide a facile, automatic, and precise method for quickly and accurately georeferencing and overlaying map image tiles. Embodiments of the present invention transparently and seamlessly overlay a first raster map image over a second raster map image.

The present invention will now be described in detail with reference to the Figures.

Figure 1:
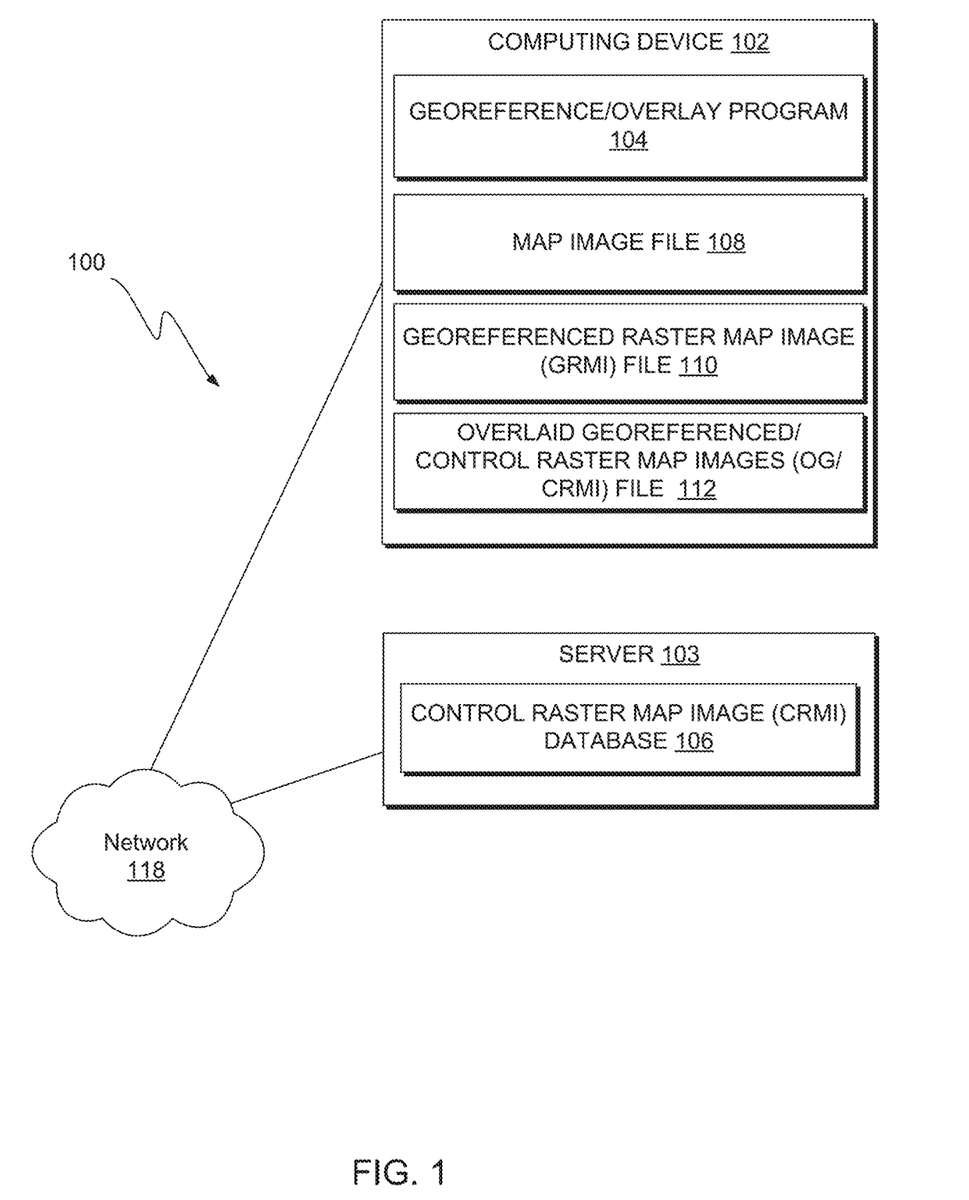
FIG. 1 is a functional block diagram illustrating a georeference/overlay environment, in accordance with an exemplary embodiment of the present invention.

FIG. 1 is a functional block diagram illustrating a georeference/overlay environment, generally designated 100, in accordance with one embodiment of the present invention. Georeference/overlay environment 100 includes computing device 102 and server 103 connected over network 118. Computing device 102 includes georeference/overlay program 104, map image file 108, georeferenced raster map image (GRMI) file 110, and overlaid georeferenced/control raster map images (OG/CRMI) file 112. Server 103 includes control raster map image (CRMI) database 106.

In various embodiments of the present invention, computing device 102 and server 103 are computing devices that can be standalone devices, servers, laptop computers, tablet computers, netbook computers, personal computers (PCs), or desktop computers. In another embodiments, computing device 102 and server 103 represent computing systems utilizing clustered computers and components to act as a single pool of seamless resources. In general, computing device 102 can be any computing device or a combination of devices with access to CRMI database 106, map image file 108, GRMI file 110, and OG/CRMI file 112 and is capable of executing georeference/overlay program 104. Computing device 102 may include internal and external hardware components, as depicted and described in further detail with respect to FIG. 5.

In this exemplary embodiment, georeference/overlay program 104, map image file 108, GRMI file 110, and OG/CRMI file 112 are stored on computing device 102. However, in other embodiments, georeference/overlay program 104, map image file 108, GRMI file 110, and OG/CRMI file 112 may be stored externally and accessed through a communication network, such as network 118. Network 118 can be, for example, a local area network (LAN), a wide area network (WAN) such as the Internet, or a combination of the two, and may include wired, wireless, fiber optic or any other connection known in the art. In general, network 118 can be any combination of connections and protocols that will support communications between georeference/overlay program 104, CRMI database 106, map image file 108, GRMI file 110, and OG/CRMI file 112 in accordance with a desired embodiment of the present invention.

In exemplary embodiments, georeference/overlay program 104 converts a map image file containing geographic information (i.e. map image file 108) into a raster map image file containing geographic information for each pixel (i.e. GRMI file 110). Georeference/overlay program 104 then precisely and automatically overlays a first raster map image tile from GRMI file 110 onto a second raster map image tile from CRMI database 106.

In exemplary embodiments, map image file 108 is a map image file containing geographic information. In various embodiments, map image file 108 is a non-raster map image file, such as a vector graphics file. In other embodiments, map image file 108 is a raster map image file whereby the pixels are not labeled with geographic information or the pixels are labeled with geographic information that is an undesired format (e.g., the pixels have UTM coordinates when latitude/longitude is desired).

In exemplary embodiments, GRMI file 110 includes one or more raster map images that include pixels labeled with geographical coordinates. The geographical coordinates labeling the pixels of raster map images included in GRMI file 110 have the same units as raster map image tiles obtained from CRMI database 106 on server 103 (e.g., both are latitude/longitude or both are UTM or both are SPS).

In exemplary embodiments, OG/CRMI file 112 includes a multilayer raster map image wherein a raster map image tile from GRMI file 110 is overlaid with a raster map image tile from CRMI database.

In exemplary embodiments, CRMI database 106 is a database that provides digital street map tiles and satellite image map tiles, wherein the map tiles are raster images having pixels labeled with geographical coordinates such as one or more of: UTM, latitude/longitude and SPS.

Figure 2:
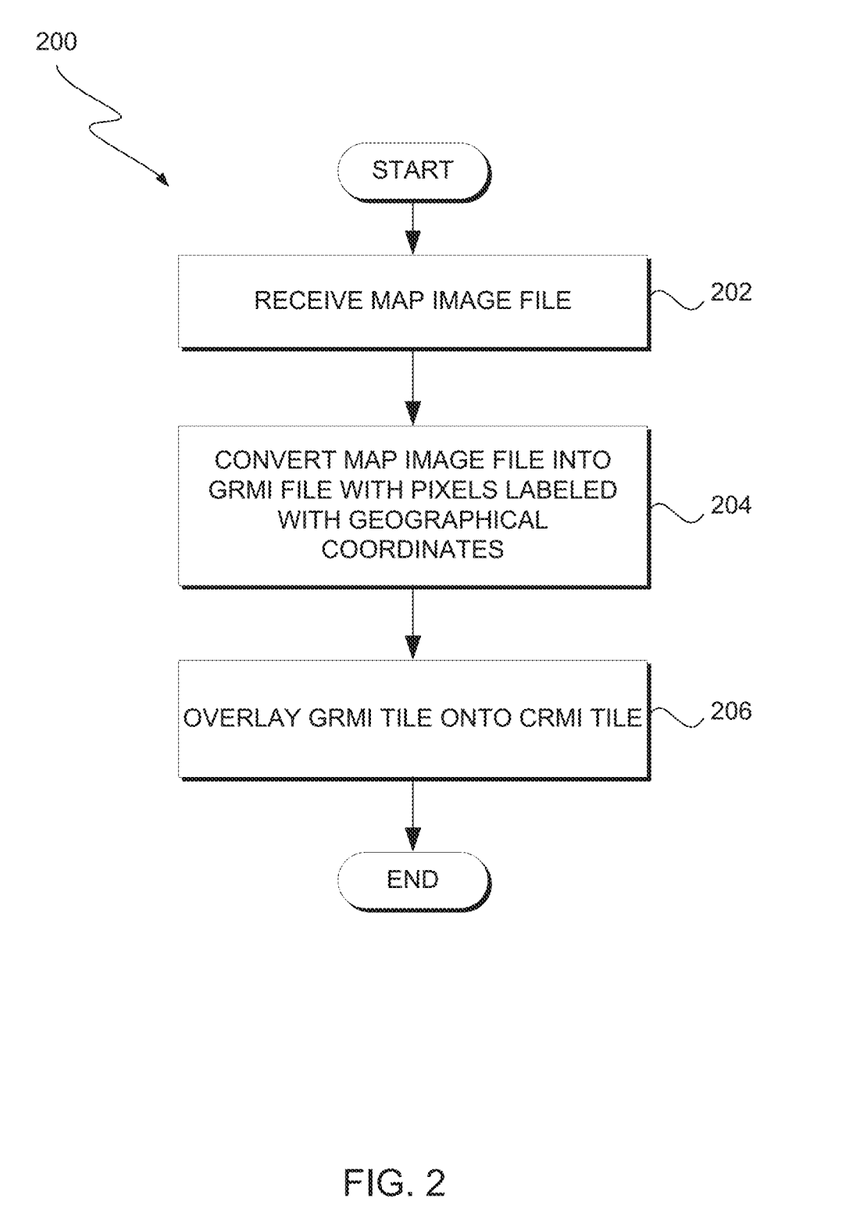
FIG. 2 illustrates operational processes for converting a map image file into a georeferenced raster map image (GRMI) file with geographical coordinate-labeled pixels and overlaying a GRMI tile onto a control raster map image (CRMI) tile, on a computing device within the environment of FIG. 1, in accordance with an exemplary embodiment of the present invention.

FIG. 2 illustrates operational processes 200 for 1) converting a map image file (such as map image file 108) into a GRMI file (such as GRMI file 110) with geographical coordinate-labeled pixels and 2) overlaying the GRMI tile onto a CRMI tile, on a computing device within the environment of FIG. 1, in accordance with an exemplary embodiment of the present invention.

In step 202, georeference/overlay program 104 receives map image file 108. In various embodiments, map image file 108 is map data showing geographical information about historic natural events such as floods, storms, and earthquakes. For example, map image file 108 includes geographical information such as Special Flood Hazard Areas (SFHAs), base flood elevations (BFEs), insurance risk zones, etc. In another example, map image file 108 includes geographical information concerning historic rainfall amounts and hurricane storm surges. In yet another example, map image file 108 includes geographical information about historic seismic activity.

In alternative embodiments, map image file 108 is map data showing geographical information about historic human populations. For example, map image file 108 includes geographical information concerning populations from historic census data. The census data includes information about human populations such as the number of people residing in an area or the demographics of the populations.

In step 204, georeference/overlay program 104 converts map image file 108 into GRMI file 110, wherein GRMI file 110 includes a plurality of pixels labeled with geographical coordinates such as UTM or latitude/longitude coordinates. GRMI file 110 is formatted in any of several possible raster formats such as JPEG/JFIF (Joint Photographic Experts Group/JPEG File Interchange Format), JPEG 2000, Exif (Exchangeable Image File Format), TIFF (Tagged Image File Format), RIF (Raw Image Formats), GIF (Graphics Interchange Format), BMP (Bitmap), PNG (Portable Network Graphics), PPM (Portable Pixmat), PGM (Portable graymat), PBM (Portable Bitmap), PNM (Portable aNy Map), etc. The processes involved in step 204 are discussed in further detail in FIG. 3.

In step 206, georeference/overlay program 104 transparently overlays an image tile from GRMI file 110 over an image tile from CRMI database 106. Georeference/overlay program 104 makes at least one of the two tiles opaque to allow a bottom map layer to be visualized underneath a top map layer. The merged product is saved as OG/CRMI file 112. In various embodiments, georeference/overlay program 104 follows set rules for determining which image tiles will be an opaque tile. In other embodiments, georeference/overlay program 104 queries a user and allows the user to determine which image tiles are to be made opaque by outputting the user-controlled merged products. In these embodiments, the user can also modify the degree of opacity in order to maximize the aesthetic appeal of the merged product to the user. Along with the degree of opacity, the RGB (red/green/blue) color levels are also modified by the user in various embodiments.

Georeference/overlay program 104 aligns the pixels of the image tile from GRMI file 110 to pixels of the image tile from CRMI database 106 so that the geographical coordinates match between pixels. In various embodiments, georeference/overlay program 104 contains executable code for overlaying image tiles having differing resolutions, i.e., georeference/overlay program 104 is configured to overlay image tiles having differing resolutions. In one example, georeference/overlay program 104 only pairs the portion of pixels between the two image tiles that match within a given threshold. In another example, georeference/overlay program 104 divides a tile with a lower resolution image into a grid with sections that match the number of pixels in a higher resolution image. In this scenario, the created grid sections of the lower resolution image are assigned geographical coordinates that are calculated based on the nearby pixel values. The grid sections are then aligned with the pixels on the higher resolution image that have matching geographical coordinates.

Figure 3:
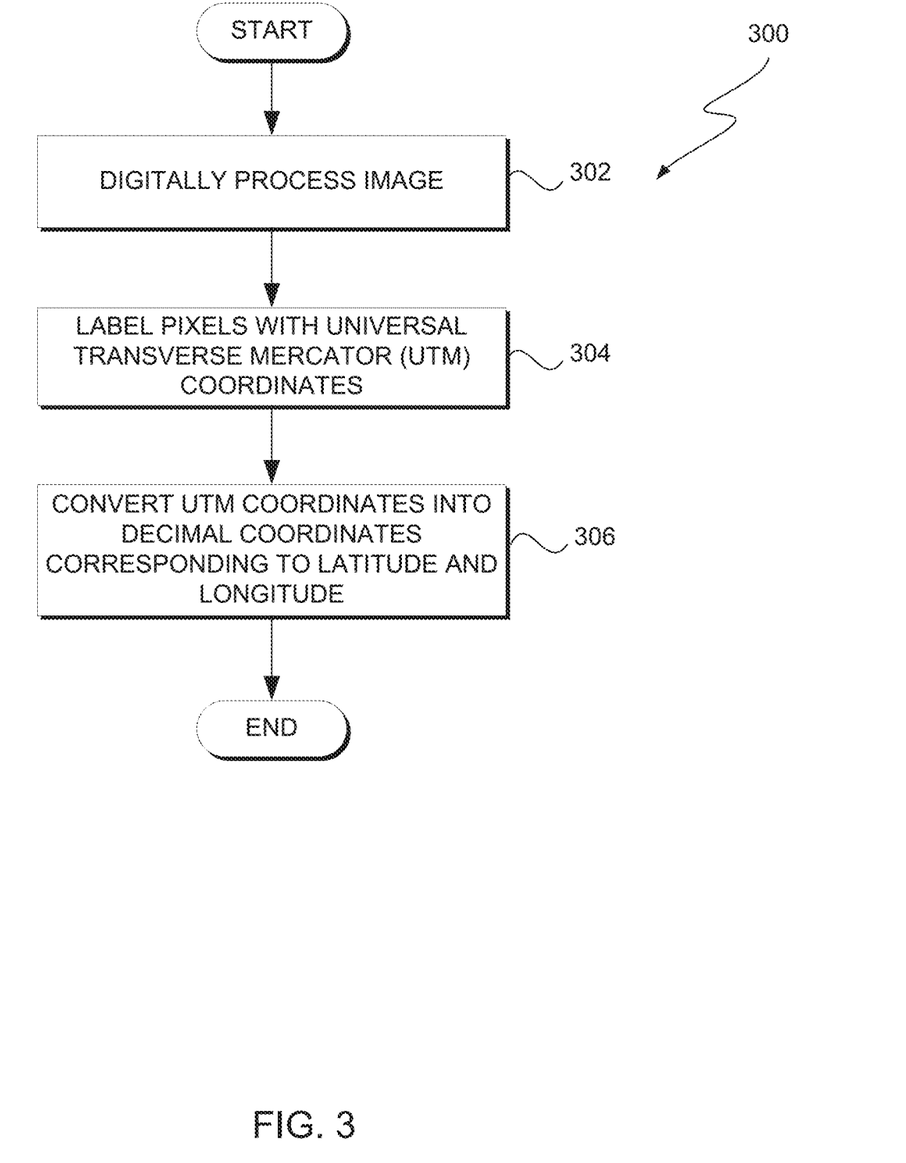
FIG. 3 illustrates operational processes for digitally processing the map image file into a pixel array file and labeling the pixels of the pixel array file with geographic coordinates, on a computing device within the environment of FIG. 1, in accordance with an exemplary embodiment of the present invention.

FIG. 3 illustrates operational processes 300 for digitally processing map image file 108 into a raster image and labeling the pixels of the raster image with geographic coordinates to provide GRMI file 110, on a computing device within the environment of FIG. 1, in accordance with an exemplary embodiment of the present invention.

In step 302, georeference/overlay program 104 digitally processes map image file 108. Image processing includes converting map image file 108 into a pixel array file.

In step 304, georeference/overlay program 104 labels the pixels of the pixel array file with UTM coordinates. In exemplary embodiments, georeference/overlay program 104 parses the pixel array file while the pixel array file is in a World file format. After georeference/overlay program 104 finishes parsing the World file document, the pixels are labeled with UTM coordinates giving geographic location information to the picture element represented by each pixel.

In step 306, georeference/overlay program 104 converts the UTM coordinates on each pixel into decimal coordinates corresponding to latitude and longitude coordinates, which is saved as GRMI file 110. The conversion of UTM coordinates to latitude and longitude coordinates and vice versa is well-known in the art and will not be discussed herein.

It should be understood that, in the description of the embodiments represented by FIG. 3, the pixels in GRMI file 110 are label as latitude and longitude coordinates. In these embodiments, the map image tiles received from CRMI database 106 contain pixels that are also labeled with latitude and longitude coordinates. In other embodiments, map image tiles received from CRMI database 106 contain pixels that are labeled with UTM coordinates. In those embodiments, step 306 is skipped because the UTM coordinate-labeled pixels obtained after step 304 match the format of the map image tiles received from CRMI database 106.

Figure 4:
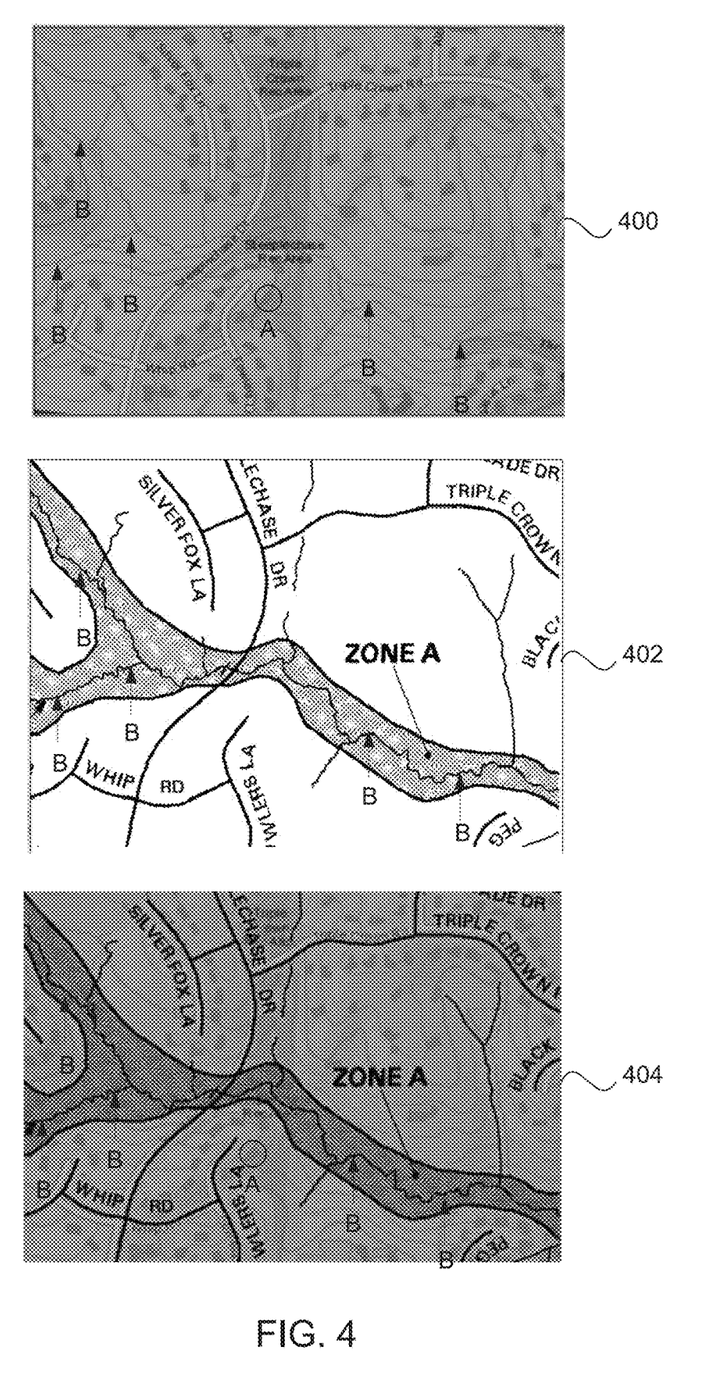
FIG. 4 illustrates an example of overlaying a GRMI tile onto a CRMI tile, in accordance with an exemplary embodiment of the present invention.

FIG. 4 illustrates an example, 400, of overlaying a GRMI tile onto a CRMI tile, in accordance with an exemplary embodiment of the present invention.

Map tile 400 is a street and topographical map tile that was downloaded from an electronic map database such as CRMI database 106. Map tile 400 is a raster image map tile that includes pixels labeled with geographical coordinates giving geographic location information to the picture element represented by each pixel. Map tile 400 shows relief topography of nearby hills along with several roads ("Steeplechase Dr.", "Whip Rd.", "Silver Fox Ln.", "Triple Crown Rd.", etc.). Other details included in map tile 400 are the silhouettes of houses along the streets (see, for example, the house circled "A") as well as rivers such as the ones pointed out in several spots "B."

Map tile 402 is a flood zone map obtainable from organizations such as FEMA. Like map tile 400, map tile 402 shows some topography (although not elevation), roads, and the same river, which has been marked in the same way. Unlike map tile 400, map tile 402 does not show houses, but it does show flood zones (e.g., "ZONE A") surrounding the river. It is likely of interest to owners of the houses near the rivers marked "B" (as well as their insurance companies) to know whether their houses are in or near a flood zone. A precise overlap between map tiles 400 and 402 will provide such information visually.

Overlap map tile 404 depicts the overlaying of map tile 400 and 402. For purposes of clearer illustration, overlap map tile 404 shows a slight offset between map tiles 400 and 402. Overlap map tile 404 allows the homeowners and their insurance companies to see whether the houses depicted in map tile 400 are in danger of future flooding because of the overlap with map tile 402. In various embodiments, georeference/overlay program 104 automatically georeferences and overlays map tile 402 onto map tile 400 to give overlap map tile 404. In some embodiments, a user of computing device 102 has the option of slightly offsetting the combined maps to see hidden details of one map tile or the other. In those embodiments, georeference/overlay program 104 returns the precise overlay of map tiles 400 and 402 upon the user command.

In exemplary embodiments, georeference/overlay program 104 includes executable code to predict the severity of future natural events, i.e., georeference/overlay program 104 is configured to predict the severity of future natural events. For example, a flood map from an emergency management organization such as FEMA is based on flooding that occurred after an extended period of precipitation. That period of precipitation was the major cause of the flooding. Georeference/overlay program 104 analyzes historic precipitation levels that led to past flood levels and uses that data to analyze forecasted precipitation levels in order to predict future flood levels. Georeference/overlay program 104 uses the predicted future flood levels to generate future flood map tiles. The precise overlay of the future flood map tiles and residential area map tiles allows emergency management organizations to prepare for the upcoming emergency event.

In one embodiment, georeference/overlay program 104 is configured to apply natural language processing to determine one or more types of information to be added, as an overlay, to a generated map. For example, in one scenario, a user is using georeference/overlay program 104 to generate maps of a neighborhood that is in a flood zone. Georeference/overlay program 104 overlays locations and visualizations of the houses and roadways of that neighborhood with a topographical map that includes known flood levels. As such, the resulting map shows which houses are in areas that have previously been flooded. Next, georeference/overlay program 104 applied natural language processing and identifies the word "water" and "flood plain" in the metadata associated with the topographical map. Georeference/overlay program 104 searches for weather maps that include historical and predicted weather. In this example, georeference/overlay program 104 identifies data indicating that six inches of rain have fallen in the last three days for a local region that includes the neighborhood. Georeference/overlay program 104 also identifies a predicted flood level included with the topographical map that has predicted flood levels in units of inches of fallen rain per day. As such, georeference/overlay program 104 determines a current level of flood water for the overlay map and adds that visualization as an additional overlay, which shows the houses in relation to that level of flooding. Georeference/overlay program 104 then accesses weather data and determines a future flood level based on the forecasted rainfall for the next three days and adds yet another layer of predicted flood level to the map. As such, the final map includes not only the predicted current flood level in relation to the houses but also the predicted future flood level.

In one embodiment, georeference/overlay program 104 searches municipal databases for recent construction projects that are not included in current maps obtained from CRMI database 106. In this embodiment, georeference/overlay program 104 also searches for map plans for current, incomplete construction projects. In such embodiments, georeference/overlay program 104 adds such newly discovered structures, for example, buildings under construction, roadways etc., to the map as one or more additional layers of overlay.

Figure 5:
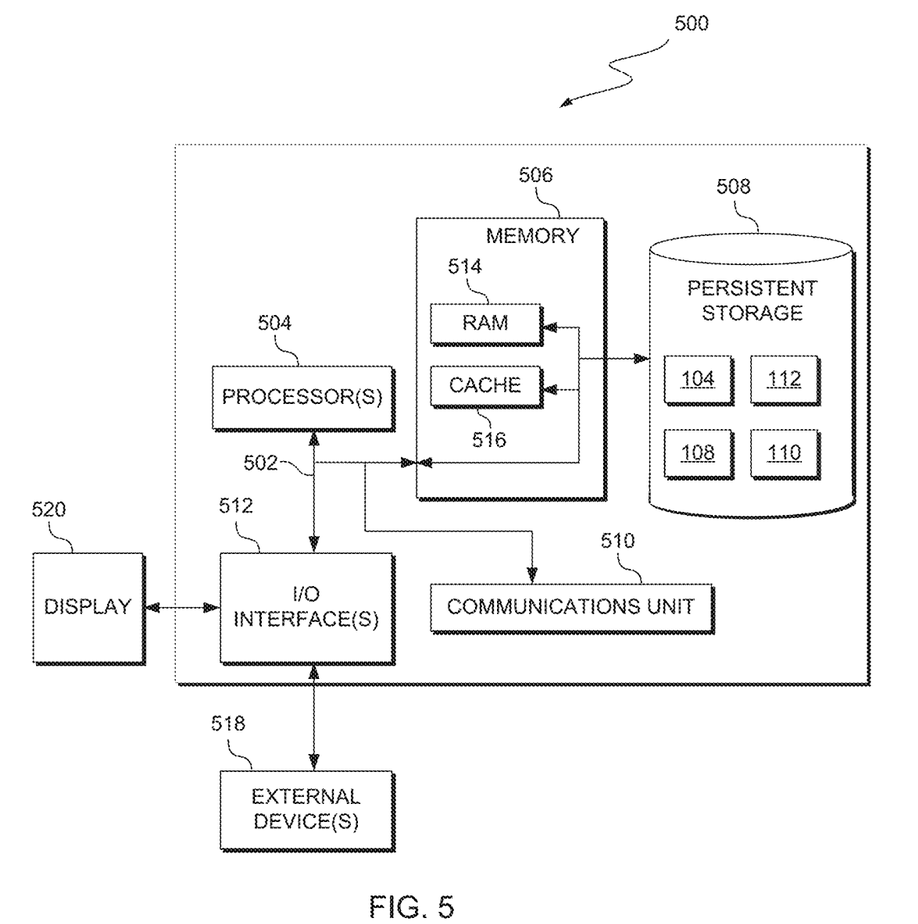
FIG. 5 depicts a block diagram of components of the computing device executing the georeference/overlay program, in accordance with an exemplary embodiment of the present invention.

FIG. 5 depicts a block diagram, 500, of components of computing device 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Georeference/overlay program 104, map image file 108, GRMI file 110, and OG/CRMI file 112 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 118. In these examples, communications unit 510 includes one or more network interface cards. Communications unit 510 may provide communications through the use of either or both physical and wireless communications links. Georeference/overlay program 104, map image file 108, GRMI file 110, and OG/CRMI file 112 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., georeference/overlay program 104, map image file 108, GRMI file 110, and OG/CRMI file 112, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by one or more processors, a map image file, wherein the map image file includes geographical and flood activity data;
   converting, by one or more processors, the map image file into a flood activity raster map image file, wherein the flood activity raster map image file includes one or more flood activity raster images, wherein the one or more flood activity raster images include a first plurality of pixels;
   labeling, by one or more processors, one or more of the first plurality of pixels with a first set of geographical coordinates using at least a portion of the geographical data included in the map image file, wherein the first set of geographical coordinates are UTM coordinates;
   overlaying, by one or more processors, one of the one or more flood activity raster images and a second raster image that includes street map data, wherein the second raster image has an image resolution that is different from an image resolution of the one of the one or more flood activity raster images, resulting in a higher resolution image and a lower resolution image, wherein the second raster image further includes a second plurality of pixels that are labeled with a second set of geographical coordinates, wherein pixels from the first plurality of pixels are overlaid with pixels from the second plurality of pixels that have same sets of geographical coordinates, wherein a tile of the lower resolution image is divided into a grid with sections that match a number of pixels in the higher resolution image, and wherein created grid sections are assigned geographical coordinates based on geographical coordinates of pixel values;
   searching, by one or more processors, municipal databases for construction projects not included in the street map data, wherein the construction projects include buildings and roadways undergoing construction;
   overlaying, by one or more processors, a third raster image to the one or more flood activity raster images and the second raster image, wherein the third raster image includes the construction projects;
   making opaque, by one or more processors, two of the one or more flood activity raster images, the second raster image, and the third raster image to allow a bottom map layer of the one of the one or more flood activity raster images, the second raster image, and the third raster image to be visualized underneath a top map layer, wherein a user is queried to determine which of the two of the one or more flood activity raster images, the second raster image, and the third raster image to make opaque, wherein the user query includes outputting to the user a merged product of overlaying the one of the one or more flood activity raster images, the second raster image, and the third raster image, and wherein the user modifies the degree of opacity of the two of the one or more flood activity raster images, the second raster image, and the third raster image; and saving, by one or more processors, the merged product of the overlaying the one of the one or more flood activity raster images, the second raster image, and the third raster image as an image file that includes a multilayer raster map image.

2. The method of claim 1, wherein the multilayer raster map image file further comprises seismic activity and weather activity data.

3. The method of claim 1, wherein the flood activity raster map image file is further comprised to have one or more of the following formats: JPEG/JFIF, JPEG 2000, Exif, TIFF, RIF, GIF, BMP, PPM, PGM, PBM, and PNM.

4. The method of claim 1, wherein the map image file is further comprised to be a vector graphics file.

5. A computer program product comprising:
one or more computer-readable storage media and program instructions stored on at least one of the one or more computer-readable storage media, the program instructions comprising:
program instructions to receive a map image file, wherein the map image file includes geographical and flood activity data;
program instructions to convert the map image file into a flood activity raster map image file, wherein the flood activity raster map image file includes one or more flood activity raster images, wherein the one or more flood activity raster images include a first plurality of pixels;
program instructions to label one or more of the first plurality of pixels with a first set of geographical coordinates using at least a portion of the geographical data included in the map image file, wherein the first set of geographical coordinates are UTM coordinates;
program instructions to overlay one of the one or more flood activity raster images and a second raster image that includes street map data, wherein the second raster image has an image resolution that is different from an image resolution of the one of the one or more flood activity raster images, resulting in a higher resolution image and a lower resolution image, wherein the second raster image further includes a second plurality of pixels that are labeled with a second set of geographical coordinates, wherein pixels from the first plurality of pixels are overlaid with pixels from the second plurality of pixels that have same sets of geographical coordinates, wherein a tile of the lower resolution image is divided into a grid with sections that match a number of pixels in the higher resolution image, and wherein created grid sections are assigned geographical coordinates based on geographical coordinates of pixel values;
program instructions to search municipal databases for construction projects not included in the street map data, wherein the construction projects include buildings and roadways undergoing construction;
program instructions to overlay a third raster image to the one or more flood activity raster images and the second raster image, wherein the third raster image includes the construction projects;
program instructions to make opaque two of the one or more flood activity raster images, the second raster image, and the third raster image to allow a bottom map layer of the one of the one or more flood activity raster images, the second raster image, and the third raster image to be visualized underneath a top map layer, wherein a user is queried to determine which of the two of the one or more flood activity raster images, the second raster image, and the third raster image to make opaque, wherein the user query includes outputting to the user a merged product of overlaying the one of the one or more flood activity raster images, the second raster image, and the third raster image, and wherein the user modifies the degree of opacity of the two of the one or more flood activity raster images, the second raster image, and the third raster image; and
program instructions to save the merged product of the overlaying the one of the one or more flood activity raster images, the second raster image, and the third raster image as an image file that includes a multilayer raster map image.

6. The computer program product of claim 5, wherein the multilayer raster map image file further comprises seismic activity and weather activity data.

7. The computer program product of claim 5, wherein the flood activity raster map image file is further comprised to have one or more of the following formats:
JPEG/JFIF, JPEG 2000, Exif, TIFF, RIF, GIF, BMP, PPM, PGM, PBM, and PNM.

8. The computer program product of claim 5, wherein the map image file is further comprised to be a vector graphics file.

9. A computer system comprising:
one or more computer processors;
one or more computer-readable storage media; and
one or more computer-readable storage media and program instructions stored on at least one of the one or more computer-readable storage media, the program instructions comprising:
program instructions to receive a map image file, wherein the map image file includes geographical and flood activity data;
program instructions to convert the map image file into a flood activity raster map image file, wherein the flood activity raster map image file includes one or more flood activity raster images, wherein the one or more flood activity raster images include a first plurality of pixels;
program instructions to label one or more of the first plurality of pixels with a first set of geographical coordinates using at least a portion of the geographical data included in the map image file, wherein the first set of geographical coordinates are UTM coordinates;
program instructions to overlay one of the one or more flood activity raster images and a second raster image that includes street map data, wherein the second raster image has an image resolution that is different from an image resolution of the one of the one or more flood activity raster images, resulting in a higher resolution image and a lower resolution image, wherein the second raster image further includes a second plurality of pixels that are labeled with a second set of geographical coordinates, wherein pixels from the first plurality of pixels are overlaid with pixels from the second plurality of pixels that have same sets of geographical coordinates, wherein a tile of the lower resolution image is divided into a grid with sections that match a number of pixels in the higher resolution image, and wherein created grid sections are assigned geographical coordinates based on geographical coordinates of pixel values;
program instructions to search municipal databases for construction projects not included in the street map data, wherein the construction projects include buildings and roadways undergoing construction;

program instructions to overlay a third raster image to the one or more flood activity raster images and the second raster image, wherein the third raster image includes the construction projects;

program instructions to make opaque two of the one or more flood activity raster images, the second raster image, and the third raster image to allow a bottom map layer of the one of the one or more flood activity raster images, the second raster image, and the third raster image to be visualized underneath a top map layer, wherein a user is queried to determine which of the two of the one or more flood activity raster images, the second raster image, and the third raster image to make opaque, wherein the user query includes outputting to the user a merged product of overlaying the one of the one or more flood activity raster images, the second raster image, and the third raster image, and wherein the user modifies the degree of opacity of the two of the one or more flood activity raster images, the second raster image, and the third raster image; and program instructions to save the merged product of the overlaying the one of the one or more flood activity raster images, the second raster image, and the third raster image as an image file that includes a multilayer raster map image.

10. The computer system of claim 9, wherein the multilayer raster map image file further comprises seismic activity and weather activity data.

11. The computer system of claim 9, wherein the flood activity raster map image file is further comprised to have one or more of the following formats: JPEG/JFIF, JPEG 2000, Exif, TIFF, RIF, GIF, BMP, PPM, PGM, PBM, and PNM.

12. The computer system of claim 9, wherein the map image file is further comprised to be a vector graphics file.

* * * * *